Aug. 12, 1958  E. A. DAVIS  2,847,531
SWITCHING SYSTEM
Filed April 21, 1954  5 Sheets-Sheet 1
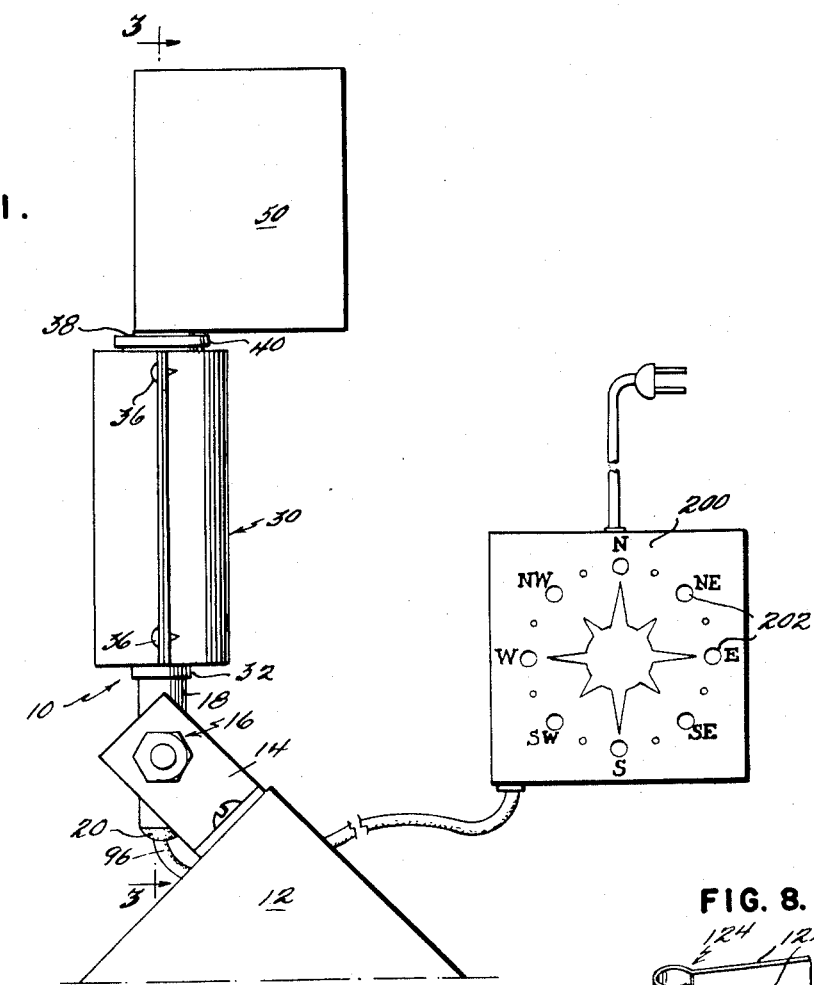
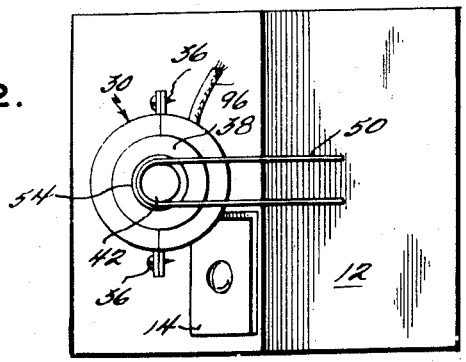
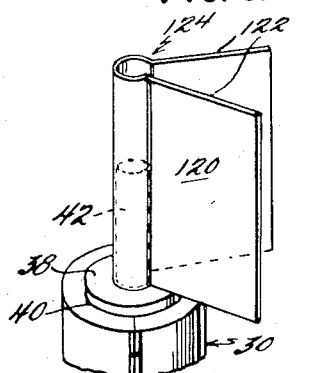
Inventor
EDWARD A. DAVIS
Attorney Aug. 12, 1958 E. A. DAVIS 2,847,531
SWITCHING SYSTEM
Filed April 21, 1954 5 Sheets-Sheet 2

Inventor
EDWARD A. DAVIS
By W. Gibson Semmes
Attorney

Aug. 12, 1958    E. A. DAVIS    2,847,531
SWITCHING SYSTEM

Filed April 21, 1954    5 Sheets-Sheet 3

Inventor
EDWARD A. DAVIS

By *N. Gibson Semmes*

Attorney

Aug. 12, 1958   E. A. DAVIS   2,847,531
SWITCHING SYSTEM
Filed April 21, 1954

INVENTOR
EDWARD A. DAVIS
BY
ATTORNEYS

Aug. 12, 1958 E. A. DAVIS 2,847,531
SWITCHING SYSTEM

Filed April 21, 1954 5 Sheets-Sheet 5

INVENTOR
EDWARD A. DAVIS

BY
*Semmes & Semmes*
ATTORNEYS

United States Patent Office 2,847,531
Patented Aug. 12, 1958

2,847,531

SWITCHING SYSTEM

Edward A. Davis, Harwichport, Mass.

Application April 21, 1954, Serial No. 424,735

7 Claims. (Cl. 200—87)

This invention relates to switching systems of the type wherein different ones of a plurality of circuits may be closed selectively in accordance with different positions assumed by a switch actuating member, and more particularly relates to an anemoscope having such a switching system; although it is readily understood that the switching system of this invention may be used in other environments.

This application is a continuation-in-part of my prior application filed August 10, 1953, Serial No. 373,191, for Switching System, now Patent No. 2,744,972, dated May 8, 1956.

A principal object of this invention is to provide a switching system adapted for use in an anemoscope and which is operable effectively in response to low torque, establishes positive and proper electrical contacts for all directional positions of the anemoscope and is sturdy, durable, resistant to wear and deterioration and has long useful life.

Another object of this invention is to provide an anemoscope having the switching system of this invention and which has improved performance, is simple, compact and durable in construction, light in weight, has relatively few parts, is easy and simple to assemble, permits wider dimensional tolerances of the parts and permits the easy use of proven electrical contact materials.

Other objects of this invention will be in part obvious and in part pointed out hereinafter.

In accordance with this invention the anemoscope has a shaft or sleeve which rotates with a weather vane and a rotary switch which has a series of stationary directional contacts and a movable actuating contact which is movable into contact with the directional contacts selectively and means are provided for positioning the actuating contact in accordance with the rotational positions assumed by the shaft or sleeve in response to the turning of the weather vane, to close a circuit through the directional contact which corresponds with the directional position then assumed by the weather vane; the stationary contacts and the movable contact being connected to the opposite poles of a source of current supply. The means for so positioning the movable contact may be purely mechanical or may utilize magnetism or gravity or both.

The invention, accordingly, consists in the features of construction, combinations of parts and arrangements of elements which will be set forth hereinafter and the scope of the application of which will be pointed out in the claims that follow.

In order that a clearer understanding of this invention may be had, attention is hereby directed to the accompanying drawings, forming a part of this application and illustrating certain possible embodiments of this invention, and in which:

Fig. 1 is a side elevational view of one possible embodiment of the invention;

Fig. 2 is a top plan view thereof;

Fig. 8 is a view in perspective fragment showing a form of vane means modified over that shown in Figs. 1, 2 and 3;

Similar reference characters refer to similar parts throughout the several views of the drawings.

Figure 3:
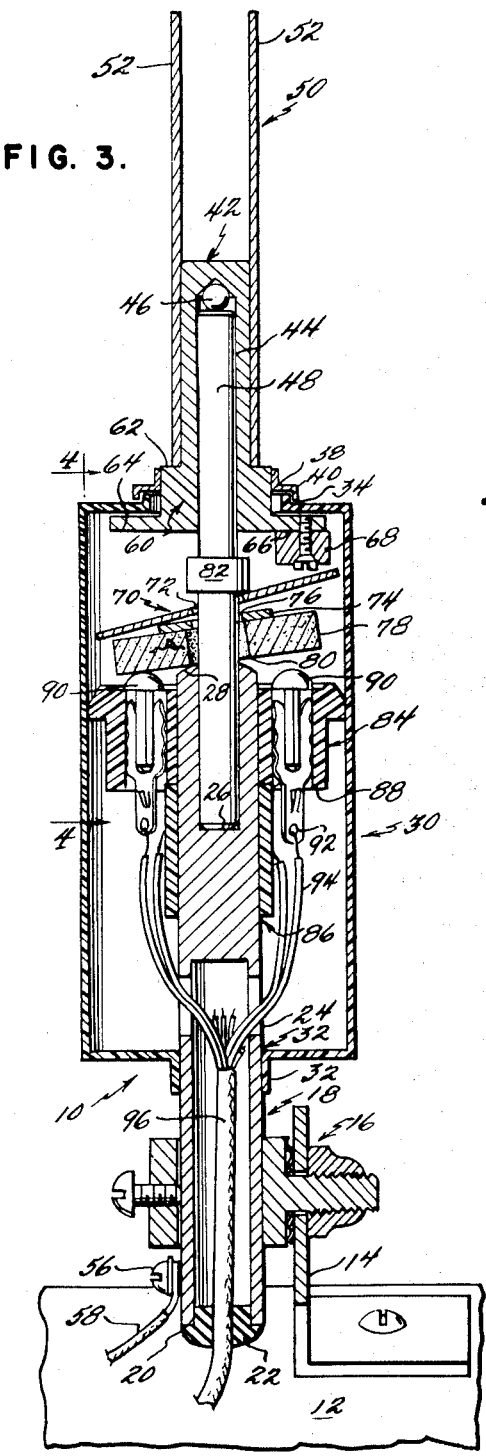
Fig. 3 is a vertical, sectional view thereof, and is taken on the line 3—3 of Fig. 1.
Figure 5:
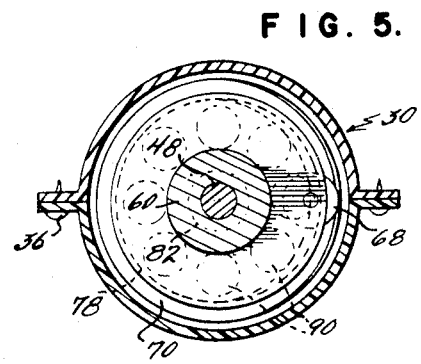
Fig. 5 is a horizontal, sectional view taken along the line 5—5 of Fig. 4.
Figure 4:
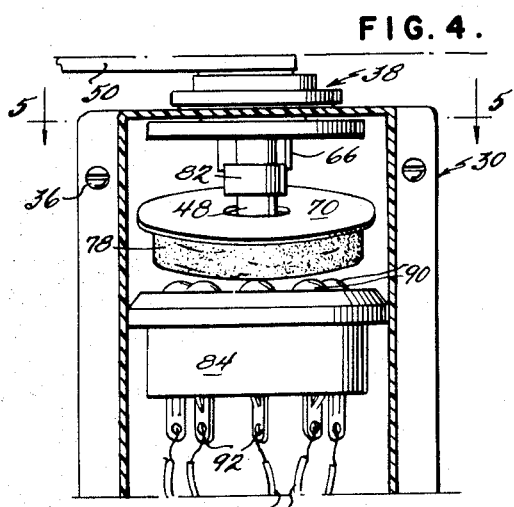
Fig. 4 is another vertical, sectional view thereof, and is taken on the line 4—4 of Fig. 3.

Referring to Figs. 1 to 5 of the drawings, there is shown a switching system 10 having a base 12, a mounting bracket 14, mounted on the base and a support receiving member 16 adjustably mounted on the bracket 14. A support standard 18 is held in member 16 as by a set screw. Support standard 18 extends vertically upwardly of the device and is adapted to receive and support the major working elements of the invention. Internal extension stem 48 and external adaptor 42 are both supported by the standard support 18; the stem is in fixed relation to the standard and the adaptor is in rotatable engagement with the stem.

A casing member 30 may consist of two semi-circular cover portions secured together as at 36 to form a cylinder. At the bottom of the casing 30, a collar 32 may depend to provide a bottom closure for the casing. A circular roofing 38 is shown to encompass the upper portion of the casing 30 to prevent rain seepage into the working elements of the device. Shield 40 of roofing 38 encompasses an annular projection 34, attached to the casing 30. The casing 30 is made of a dielectric material.

A vane member 50 is secured in fixed relation to the extension 42.

Leading from the standard support 18 is a conduit 96 adapted to encase a plurality of electrical conductors each of which is connected at one end to signal lamps 202 of an indicating scope 200 and at another end to a plurality of contact points 90 set within the casing 30.

In Fig. 3 of the drawings the detailed structure of one form of the device is shown. Standard 18 is shown to have a cylindrical bore 20 at the base thereof, said portion being adapted to contain the conduit 96 and to retain said conduit within the support as by an adaptor 22. A plurality of apertures 24 pass through the support member 18 to guide conductors 94 therethrough. Upon an upper portion of the support 18 there is provided a bore 26 adapted to receive an extension rod 48 in semi-fixed engagement. The extension rod 48 and the support member 18 together, comprise the standard for the major working elements of the invention. Upon the upper extremity of the standard support 18, an annularly bevelled surface 28 is machined for bearing a contactor element 78 described hereinafter.

Again with reference to Fig. 3 of the drawings, a rotatable external adaptor 42 engages the support extension 48 by means of a ball bearing 46. Adaptor 42 is provided with an axially machined bore 44 adapted to receive the fixed shaft 48 in bearing relation thereto. Vane means 50 consists of at least one wind engaging surface 52, and an adaptor engaging surface 54. Preferably, the vane 50 comprises at least two wind engaging surfaces 52 joined as at 54 to form a U-shaped spring vane bent upon itself, at the point of adaptor contact.

The support standard 18 is preferably made of an electrically conductive substance. This support serves as a ground conductor to carry a load received from one or more contact points through the contactor to ground a ground lead 58 engaging the standard 18 as at 56.

A lower portion of the vane adaptor 42 is shown as at 60. This lower portion 60 consists of a cylinder section 62 having disc-like flange 64 protruding outwardly therefrom to provide a mounting 66 for the magnet 68 fixedly secured eccentrically thereto.

A magnetically permeable lever member 70 in the form of a disc is passed onto the shaft 48 axially thereof as at 72. Aperture 72 is cut centrally of the lever member 70 and is sufficiently wide to enable the lever member 70 to engage the support extension 48 as by floating rotation in cam relation. A spacer 74 engages the shaft 48 as at 76 in a manner similar to that of the lever member 70 with respect to shaft 48. Spacer 74 serves as an auxiliary lever member.

A contact member 78 is placed beneath the spacer 74 to engage the shaft 48 as at 80. Contact member 78 is composed of a magnetically impermeable material adapted to effect maximum conductivity of electrical energy from a plurality of contacts 90 to the standard support 18. Carbon, graphite or compositions of these and other lubricant materials with metal can be substituted in accordance with the desired wear, lubricant and conductivity characteristics. The contact member, as the spacer and lever member, is provided with an aperture centrally therethrough and suitable for effecting floating rotation thereof about the shaft extension 48.

Spaced along the shaft 48 and in adjustable relation thereto, there is provided a semi-fixed collar member 82. Collar 82 serves as a fulcrum for the lever 70, one portion of the lever being constantly proximate to the magnetic field produced by the eccentrically disposed magnetic member 66. By virtue of the relation of the lever member 70 with the fulcrum member 82 and the spacer 74, a compound lever system is effected against the contact member 78.

A dielectric contact housing 84 is fixed to the upper portion of the standard 18. This housing is adapted to contain a plurality of contactors 90, for peripheral spacing about the support 18. Within the housing 84 there are a plurality of apertures 88 passing therethrough for receiving the contactor points and connectors 92.

Figure 9:
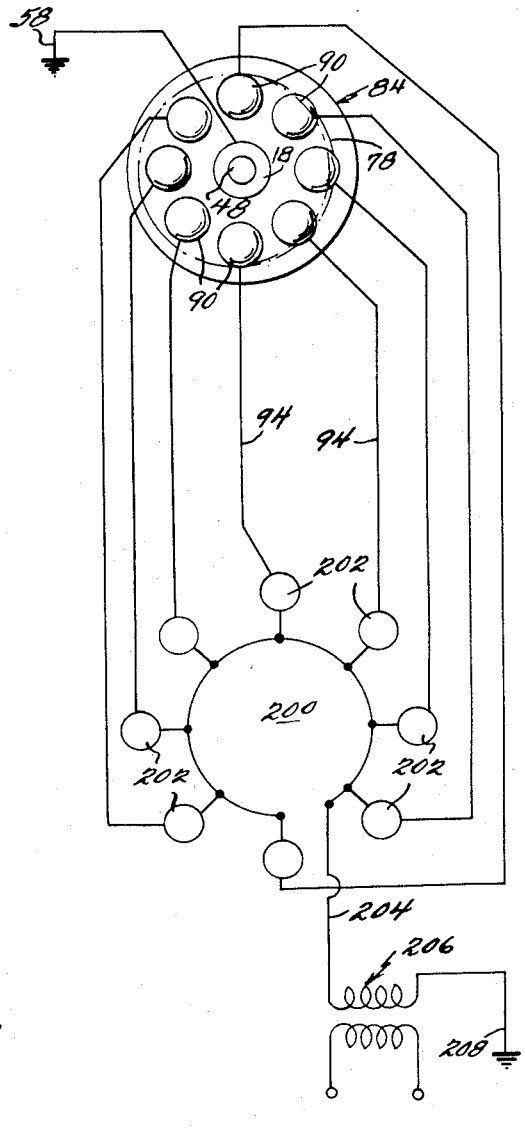
Fig. 9 is a wiring diagram of a circuit which may be employed in an anemoscope embodying this invention.

One form of circuitry which may be used to carry out the present invention is shown schematically in Fig. 9 of the drawings. Again, the contact points are shown as at 90 peripherally disposed about a housing 84. The support member is shown centrally of the housing 84 as at 18 and the contactor disc 78 is in phantom detail. In the form shown herein, the circuit lies from ground 58 through the conductor-standard 18, contactor 78 to contactor points 90; therethrough to contactor point jacks 92 through lead wires 94 to terminals at the plurality of lamps 202 disposed radially about scope 200 and thence through a concentric conductor 204 through transformer 206 and finally to ground 208.

Figure 6:
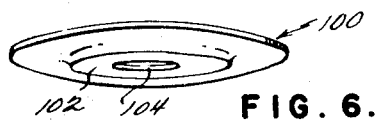
Fig. 6 is a view in perspective of a modified lever member.
Figure 7:
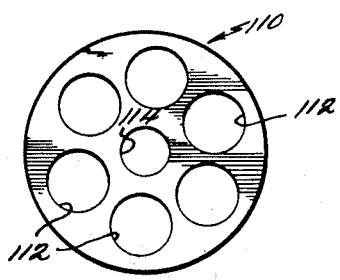
Fig. 7 is a plan view of a further modification of a lever member.

Structural modifications of the lever member of Fig. 3 are illustrated in Figs. 6 and 7 respectively. With respect to the modification shown in Fig. 6, the spacer 74 and the lever member 70 of Fig. 3 have been combined into a unitary structure wherein the unitary lever 100 comprises a circular magnetically permeable disc having a depression 102 formed concentrically inwardly of the periphery of the disc. Within the disc 100 there is provided an aperture 104 centrally thereof for passage over the shaft 48 of the device. The base of the depression 102 is adapted to serve the same function as the secondary lever-spacer 74 shown in Fig. 3.

The modification shown in Fig. 7 again is made of a magnetically permeable material, this particular modification 110 having a plurality of perforations 112 spaced peripherally about the center of the device, the center being defined by an aperture 114 adapted for passage over a shaft 48. In the utilization of this modification, a lever-spacer 74 is required for direct contact with contactor member 78. By virtue of the construction shown, direct contact to the spacer 74 is maintained while the magnetically permeable lever 110 is attracted to the magnetic field within which it resides.

A modified vane structure is shown in Fig. 8 wherein the vane 120 comprises at least two exposed members 122 flaring angularly outwardly from a frictionally engaging bend 124 joining the wind engaging members 122.

In operation, the vane 50 may be rotated as by variations in prevailing winds to certain bearings. Each bearing is transmitted by the vane engaging adaptor 42 to the eccentrically disposed magnetic member 68, such that the bearing may be registered by magnetically attracting the lever member 70 upwardly. Thus the lever member 70 is impinged upwardly against the fulcrum 82 and again by the downward thrust against the spacer 74 for imposing leverage upon the contactor-lever 78 between the contact point 90 and the bevelled surface 28 of ground standard 18. Referring to Fig. 3, the specific operative relation to parts is shown in some detail. It is there shown that the lever member 70 does not actually engage the magnetically disposed element 68, nor does the lever 70 engage the contact member 78. One of the principal features of the device resides in the inherent quality thereof to effect positive contact, with one or more points such that the rotational disposition of the magnet 68 shall not disturb contact by wiping or sliding motion as is prevalent in devices heretofore constructed. The lever 70 being made of a magnetically permeable material and the contactor 78 being made of a non-magnetic highly conductive substance, maximum efficiency of operation is obtained. Moreover, the floating and rotational disposition of the lever and associated contact element permit desired non-wiping contact and a responsive sensitivity heretofore unknown.

Figure 10:
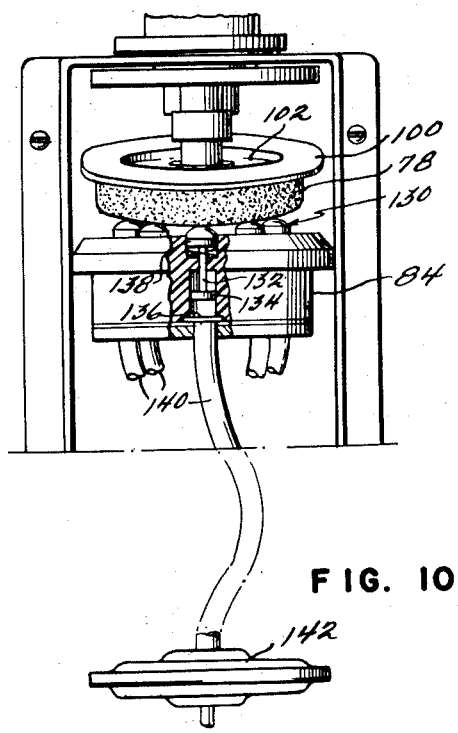
Fig. 10 is a view similar to Fig. 4, but shows a structural modification.

A modification of the invention is shown in Fig. 10 wherein the compound lever system previously described is adapted to mechanical means as opposed to means for effecting electrical contact. In Fig. 10, there is shown a unitary lever element 100 having a depression 102 suitable for transmitting the downward force of the lever against a contact member 78. In this instance, as in the original construction, the cam-like force of depression 102 on contact member 78 is effected intermediate of the point of contact and the bevelled surface of support 18 rockably supporting the contact member. Contact member 78 is preferably made of a lubricant material such as a graphite. As in the aforementioned innovation, so here, contact members are arranged peripherally about the support standard. In this modification, the contact members 130 comprise reciprocably operable piston units which are spring loaded for return to battery upon release from contact. The unit consists of a shaft 132 and piston 134 suitably recessed in the support housing 84. Chambers 136 and 138 respectively confine the piston and cam thereof for movement within the housing 84. At the lower extremity of the chamber 136 there is provided a suitable valve for restricting back pressures into the chamber. From chamber 136, there is provided a conduit 140 for transferring pressures to a bellows 142. Bellows 142 is adapted to convert pressure to mechanical energy.

By the device herein shown, the force of wind may be utilized to transmit mechanical force through a movable magnetic field and an innerconnected leverage system, to effect work or alternatively to provide means for effecting mechanical registry for indicating the varying disposition of wind direction.

Figure 11:
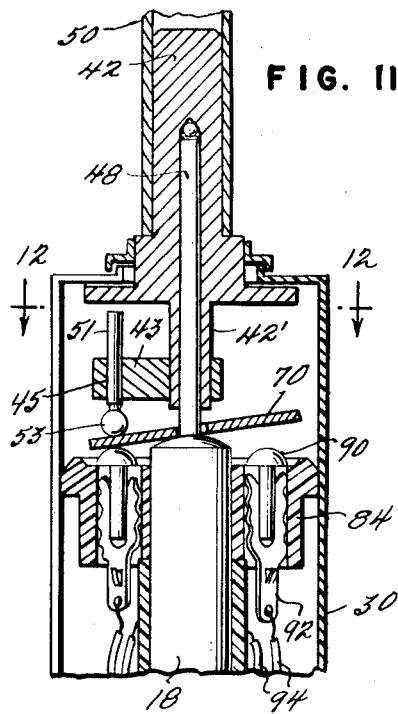
Fig. 11 is a vertical sectional view showing one possible form of switch actuating means utilizing gravity.
Figure 12:
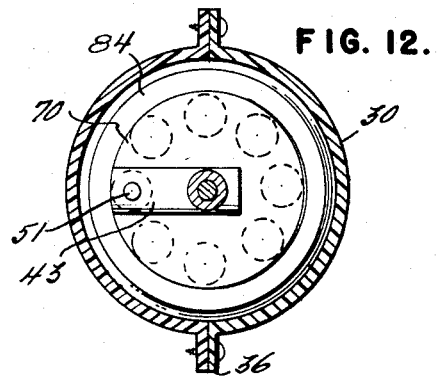
Fig. 12 is a horizontal sectional view thereof and is taken on line 12—12 of Fig. 11.

In the modification shown in Figs. 11 and 12, gravity instead of magnetism is utilized. The adaptor 42 is provided with a central downwardly extending sleeve 42' through which support 48 passes. The disc 70 rests rockingly directly on the rounded top of support 18 and is rockable universally into direct contact with the different contacts 90 separately. Disc 70 now serves as the movable contact of the rotary switch comprising contacts 90 and contact disc 70. A sidewise extending arm 43 is fixed to the sleeve 42' of adaptor 42 to rotate therewith, and toward its outer end the arm has a vertical bore, as at 45, in which is slidably seated a pin 51 having a weight 53 at its lower end. This weight 53 rests by gravity on the top surface of contact plate 70 near its periphery with sufficient force to tilt the disc 70 down into contact with that switch contact 90 which is at that time under the weight 53, thus closing the circuit from the support 18 to that particular contact 90. The bottom of the weight preferably is smooth and rounded so as to reduce to a minimum friction between the weight 53 and the contact disc 70 as the weight is moved about on the disc in accordance with movement of the weather vane and adaptor 42. Thus gravity acting through weight 53 will cause the contact disc 70 to make contact with different ones of the switch contacts 90 in accordance with the different positions assumed by the weather vane.

Figure 13:
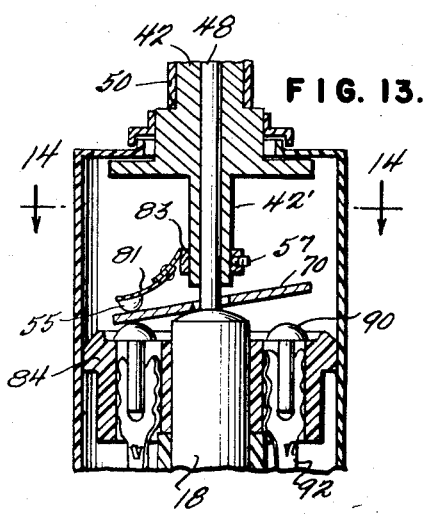
Fig. 13 is a vertical sectional view showing one possible purely mechanical form of switch actuating means.
Figure 14:
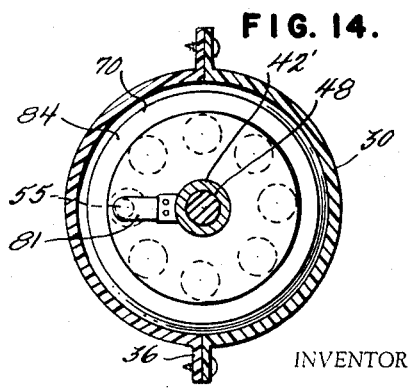
Fig. 14 is a horizontal sectional view thereof and is taken on the line 14—14 of Fig. 13.

The modification shown in Figs. 13 and 14 is quite similar to that shown in Figs. 11 and 12, and differs therefrom in that instead of gravity alone pulling the weight 53 down on the contact disc 70, a weight 55 is provided which is spring-pressed down on the disc 70 by means of a spring arm 81 which at its outer end is fixed to the weight 55 and at its inner end is secured to a collar 83 which is fixed to the adaptor extension 42', as by set screw 57 to rotate therewith.

Figure 15:
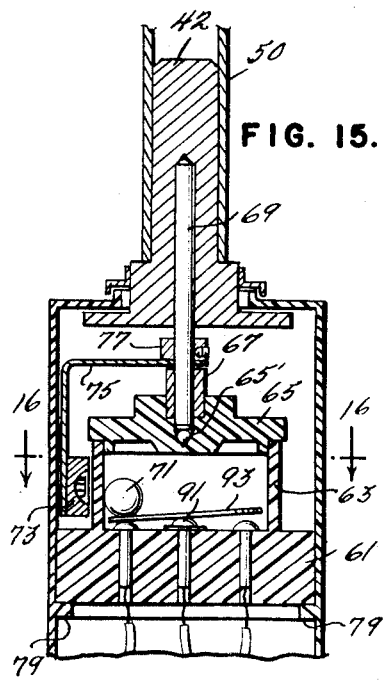
Fig. 15 is a vertical sectional view showing one possible form of switch actuating means utilizing both gravity and magnetism.
Figure 16:
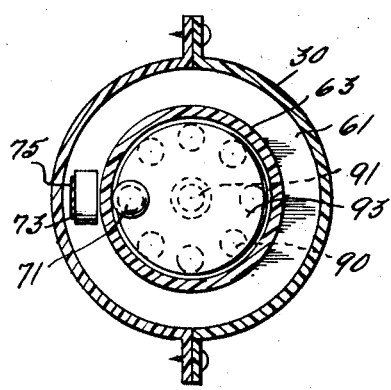
Fig. 16 is a horizontal sectional view thereof and is taken on the line 16—16 of Fig. 15.

In the modification shown in Figs. 15 and 16, both gravity and magnetism are utilized. In this form the support 18 does not extend to or through a contact housing, and a housing 61, is provided which carries not only the switch contacts 90 but also carries at its center a common contact 91 which is in constant connection with one side of the source of current supply. This contact 91 protrudes further above the housing 61 than do the directional contacts 90. A circular cage 63 having an open bottom is secured to the top of housing 61 and encircles the group of contacts 90 and 91. Cage 63 has a top 65 which at its center has a downwardly extending bearing recess 65' and an upwardly extending bearing sleeve 67. A pin or rod 69 is fixedly secured in the bore of adaptor 42. Pin 69 protrudes downwardly from adaptor 42 and at its lower end extends through bearing sleeve 67 of cage 63 and rests rotatably in the bearing recess 65' of the cage top 65.

A disc 93 of conducting material is loosely confined in cage 63 by the sides of the cage, the expanse of the disc being great enough to extend over all of the contacts 91 and 90, and by reason of the fact that contact 91 is higher than any of the contacts 90 this disc 93 may be rocked universally on contact 91 into contact with any of the contacts 90 to establish a circuit between contact 91 and the particular contact 90 contacted by the tilted disc. To rock or tilt the disc 93 into contact with a contact 90 a weight 71, shown in the form of a ball, and of magnetic material such as steel is loosely disposed on the top of contact disc 93 so that when the ball 71 is near the periphery of disc 93 it will tilt or rock the disc on contact 91 into contact with the particular contact 90 that is under the ball, and thus establish a circuit between common contact 91 and that particular contact 90. To draw the ball to the periphery of contact disc 93 and to move the ball about on the disc in accordance with different positions assumed by the weather vane, a magnet 73 is suspended outside of and in proximity to the side of cage 63 to be moved about the cage and by magnetic attraction carry the ball 71 about the inside of the cage and around on the disc 93. Magnet 73 is attached to the lower end of a vertical angle member 75, the free end of the upper arm of which is secured to pin 69 for rotation therewith. As shown, the arm 75 is fixed to a collar 77 which is fixed to the pin 69 to rotate therewith. Thus magnetism positions the weight 71 in positions on disc 93 and over a contact 90 in accordance with the positions assumed by the weather vane and gravity exerted through weight 71 tilts or rocks the disc 93 into contact with that directional contact 90 which corresponds to the position assumed by the weather vane. Lugs or a shoulder piece 79 may be provided on the interior of the casing 30 to support the contact housing 61 therein.

Figure 17:
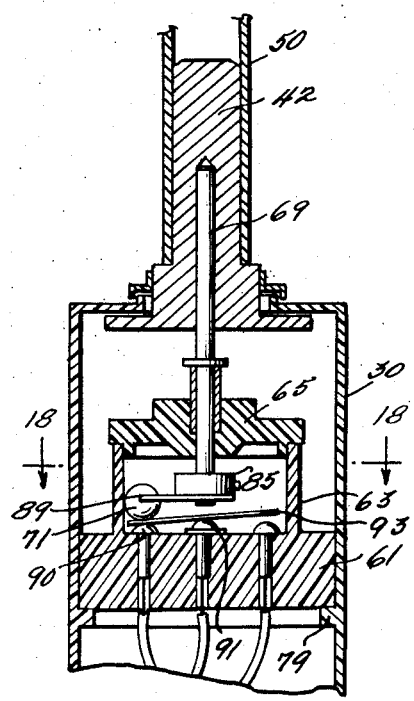
Fig. 17 is a vertical sectional view showing still another form of switch actuating means utilizing gravity.
Figure 18:
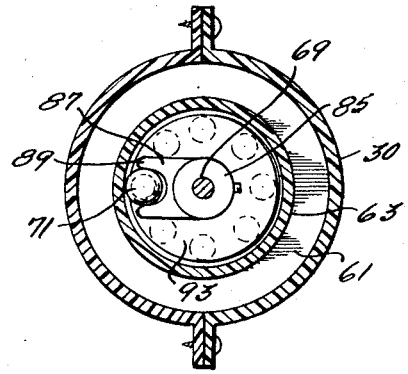
Fig. 18 is a horizontal sectional view thereof and is taken on the line 18—18 of Fig. 17.

The modification shown in Figs. 17 and 18 is quite similar to that shown in Figs. 15 and 16 but instead of utilizing magnetism to shift the weight 71 about on the contact disc 93, this form utilizes mechanical means. To this end the pin or shaft 69 extends entirely through the top 65 of the cage 63 and protrudes into the interior of the cage, and there has fixed to it for rotation therewith a collar 85. A side wise extending arm 87 having a bifurcated outer end 89 is fixed to the collar 85 to rotate therewith and the two fingers of the bifurcated end of arm 87 are disposed on opposite sides of the weight 71, whereby the weight 71 is carried about on the contact disc 93 as the weather vane assumes different directional positions.

The adaptor 42 and its extensions 42' and 69 constitutes a shaft which rotates with the weather vane.

The operation of the switching system and of an anemoscope embodying the switching system and all the modifications thereof will be clear from the above description and no further description of the operation is believed to be necessary.

As many changes may be made in the above construction and as many modifications may be made without departing from the scope of this invention it is understood that all matter contained in the above description or shown in the accompanying drawings be interpreted as illustrative and not in a limiting sense.

What is claimed is:

1. An electrical switching device having a support, a vertical shaft rotatably carried on said support, means for rotating said shaft, a contact disc concentrically disposed with respect to the axis of said shaft and in floating arrangement with respect thereto, a series of stationary contacts arranged concentrically about the axis of said shaft and located beneath the plane of said disc in the vicinity of the periphery of the disc, means spatially aligned with an edge portion of said disc for mounting said disc to be universally rockable on its center progressively into contact with different ones of said stationary contacts selectively in accordance with the diametrical line of the disc along which the disc is rocked, a switch actuating member connected to said shaft to rotate therewith and mounted to move about said disc adjacent its periphery, a freely vertically movable power connection between said actuating member and said disc in the vicinity of the periphery thereof and circumferentially movable by said actuating member whereby said disc is progressively rocked into contact with different ones of said contacts in accordance with different positions of the actuating member relatively to said disc, a source of electrical current, said stationary contacts being connected in parallel to one pole of said source of current and said means mounting said disc to be universally rockable on its center being connected to the other pole of said source of current.

2. An electrical switching device as set forth in claim 1 in which said actuating member and power connection between said actuating member and said disc comprises an arm fixed to and extending laterally from said shaft and spaced above said disc and a weight mounted for free vertical reciprocation in said arm, said weight resting on the upper surface of said disc in the vicinity of the disc periphery and being movable about on said disc by said arm.

3. An electrical switching device as set forth in claim 1 in which said actuating member and power connection between said actuating member and said disc comprises a spring arm fixed to and extending laterally from said shaft and spaced upwardly of said disc and a weight carried on the outer end of said arm and bearing under the spring pressure of said arm on the upper surface of said disc in the vicinity of the disc periphery and being movable about said disc by said arm.

4. An electrical switching device as set forth in claim 1 in which said stationary contacts are mounted in a housing, and wherein said means spatially aligned with an edge portion of said disc comprises a ball cage mounted on the top of said housing and surrounding said stationary contacts, a common contact mounted in said housing centrally of said stationary contacts and protruding upwardly of the housing higher than said stationary contacts, said contact disc being loosely disposed in said cage and confined therein by the side walls of the cage and at its center resting on said common contact so as to be rockable universally thereon into contact with different ones of said stationary contacts in accordance with the diametrical line of the disc on which the disc is rocked, the disc in the vicinity of its periphery being over all of said stationary contacts, a weight of magnetic material resting on and movable about the disc in the vicinity of its periphery and means for so moving the weight about on the disc, said means including a vertical angle member fixed to said shaft to rotate therewith and having an arm extending laterally from the shaft and an arm depending from the horizontal arm and disposed outside of said cage in the vicinity thereof and a magnet carried on said depending arm outside of and close to the side walls of the cage, whereby said weight is moved about on said disc by magnetic attraction of said magnet in accordance with the movement of said magnet about the cage by said angle member and shaft, and the disc is rocked along different diametrical lines of the disc into contact with different ones of the stationary contacts in accordance with different rotative positions of said shaft.

5. An electrical switching device as set forth in claim 1 in which said stationary contacts are mounted in a housing and are exposed at the top of the housing, and wherein said means spatially aligned with an edge portion of said disc comprises a ball cage mounted on the top of said housing and surrounding said stationary contacts, a weight resting on and movable about the disc in the vicinity of its periphery, an arm fixed to and extending laterally from said shaft and having a bifurcated outer end embracing said weight horizontally, whereby said weight is moved about on said disc by said arm and the disc is rocked along different diametrical lines of the disc into contact with different ones of the stationary contacts in accordance with different rotative positions of said shaft.

6. A switching system according to claim 1 in which there are a plurality of contact points and means for reciprocably mounting said contact points on said support beneath said disc.

7. An electrical switching device as set forth in claim 1 in which said stationary contacts are mounted in a housing and are exposed at the top of the housing, and wherein said means spatially aligned with an edge portion of said disc comprises a ball cage mounted on the top of said housing and surrounding said stationary contacts, a weight resting on and movable about the disc in the vicinity of its periphery, an arm fixed to and extending laterally from said shaft and having means on the outer end thereof operatively associated with said weight and operable to circumferentially move said weight whereby said weight is moved about on said disc by said arm and the disc is rocked along different diametrical lines of the disc into contact with different ones of the stationary contacts in accordance with different rotative positions of said shaft.

References Cited in the file of this patent

UNITED STATES PATENTS

| | | |
|---|---|---|
| 1,395,042 | Fuegel et al. | Oct. 25, 1921 |
| 2,339,063 | Deakin | Jan. 11, 1944 |
| 2,399,944 | Sealey | May 7, 1946 |
| 2,492,727 | Ballard | Dec. 27, 1949 |
| 2,611,051 | Kolff | Sept. 16, 1952 |
| 2,744,972 | Davis | May 8, 1956 |

FOREIGN PATENTS

| | | |
|---|---|---|
| 168,350 | Great Britain | Sept. 8, 1921 |